INVENTOR
GERALD J. LUTHER

INVENTOR
GERALD J. LUTHER

Sept. 20, 1971 G. J. LUTHER 3,606,606
OVEN BURNER CONTROL SYSTEMS
Filed Oct. 6, 1969 3 Sheets-Sheet 3

INVENTOR
GERALD J. LUTHER
BY
Learman, Learman & McCulloch

United States Patent Office 3,606,606
Patented Sept. 20, 1971

3,606,606
OVEN BURNER CONTROL SYSTEMS
Gerald J. Luther, Saginaw, Mich., assignor to
Baker Perkins Inc., Saginaw, Mich.
Filed Oct. 6, 1969, Ser. No. 864,128
Int. Cl. F23n 5/00
U.S. Cl. 431—66                 12 Claims

ABSTRACT OF THE DISCLOSURE

An oven burner control system for maintaining the operation of the oven burner system of a baking oven for bakery products during power failures of short duration. The oven burners are adapted to be connected with a source of gaseous fuel through an electrically controlled valve adapted to be connected with a source of electrical power. The control valve is manually movable to an open fuel supplying position and a control element is operable to hold the control valve in the open position so long as the electrical signal from the power source remains substantially constant. Electrically operable and normally continuously energized fuel ignitors are provided for igniting the fuel. Timer apparatus is provided for precluding operation of the fuel ignitors for a predetermined time at the commencement of a baking cycle to accomplish purging of the oven prior to ignition. At the end of the cycle the timer is reset when the power is turned off. To prevent the timer from being reset during a momentary interruption of power and from commencing its timing cycle when power is resumed, power is supplied to the timer for a short time after there is a power source interruption. Relay means is connected in parallel with the timer apparatus for controlling the fuel ignitors. Time delay control apparatus is connected in circuit with the control valve, the relay apparatus, the timer, and the power source to delay the effect which an electrical signal interruption otherwise would have on the control valve, relay apparatus, and timer. Interchangeable connectors are provided for selectively connecting the time delay control apparatus into the circuit.

---

This invention relates to an oven burner control system and more particularly to a system which will prevent the interruption of fuel flow to the oven burners during momentary electrical power interruptions and yet provide for safe and reliable operation of the oven burner equipment during sustained power failures.

It is an object of the present invention to provide a control system for preventing the shutdown of a baking oven due to a temporary electrical power interruption, but yet eliminating the hazard if the power loss is permanent.

It is another object of the present invention to provide a control system for an oven burner system for maintaining the fuel valve associated with the oven burners in an open position to permit fuel to flow to the oven burners, and to maintain an auxiliary control relay energized to provide uninterrupted continuity in the control circuitry, during momentary electrical power fluctuations.

It is yet another object of the present invention to provide interchangeable connectors with a burner control system for minimizing the system maintenance.

Briefly, in accordance with the present invention, a burner control system is provided to insure a flame sustaining flow of fuel to the oven burners during momentary electrical power failures and includes electrically controlled fuel valve means responsive to an electrical signal of a predetermined level for permitting fuel to flow to the oven burners. The valve means is responsive only to a sustained interruption in the power signal to interrupt the flow of fuel to the burner means. Control means is connected in circuit with the valve means, with a purge insuring timer, and with the fuel ignitors, for maintaining said fuel igniting means, valve means, and timer energized during a predetermined short duration interruption in the power signal which otherwise would deenergize the valve means, timer, and electrodes, thereby providing for continuity of operation during momentary electrical power interruptions.

Other objects and advantages of the present invention will become apparent to those of ordinary skill in the art by the following description when considered in relation to the accompanying drawing in which.

Figure 1:
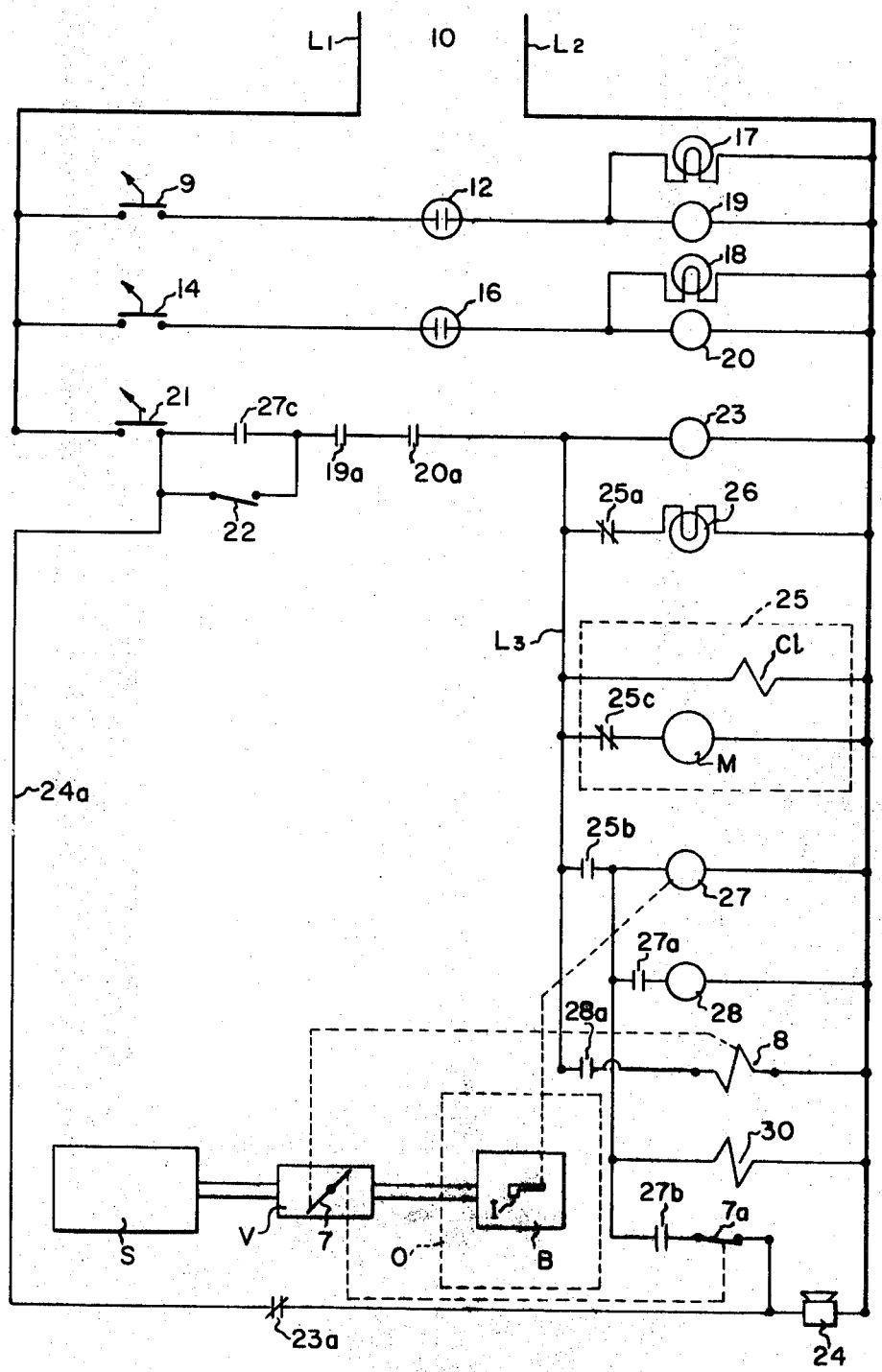
FIG. 1 is a schematic diagram of a burner control circuit without the trip delay unit and auxiliary control relay which characterize the invention.

Referring now more particularly to the drawings, and in the first place to FIG. 1, a burner system B for a bakery oven O is connected with a source of gas S through a suitable valve, shown schematically at V, the operation of which will be described more fully hereinafter with reference to the control circuit. The valve V is schematically shown to include a spring returned gate 7 pivotally mounted to permit gas to flow therepast, or, to interrupt the flow of gas when it is in the position shown in the drawing. The gate 7 is manually movable to the open position, however, it is maintained in this position by means of a solenoid shown generally at 8 as will be later described. Such valves are commercially available and are commonly referred to as gas safety valves. A suitable valve is the Maxon valve, Series No. 808, manufactured by Maxon Premix Burner Company of Muncie, Ind.

The input 10 for the control circuit is a suitable source of alternating current connected across the lines $L_1$ and $L_2$. Connected across the lines $L_1$ and $L_2$ through a switch 9 is a turbine blower fan, generally indicated at 12, which is energized to provide an adequate supply of air for purging the oven burner system of combustible gases prior to the ignition of burner fuel in order to preclude a premature detonation of the fuel gases. Also connected across the lines $L_1$ and $L_2$ through a switch 14 is an exhauster fan 16 which operates in conjunction with the blower fan 12 to draw the air supplied through the oven chamber and thus remove any combustible gases collected therein. After the gaseous burner fuel is ignited in a manner to be later described, the turbine fan 12 remains on to provide a proper mixture of gaseous fuel and air, and the exhauster fan 16 remains on to exhaust the spent gases and products of combustion. Electrical indicators such as lamps 17 and 18, are associated with the turbine fan 12 and the exhauster fan 16, respectively, for indicating the energization thereof. Connected in series circuit relation with the turbine fan 12 and exhauster fan 16 are relays 19 and 20 which, when energized, operate to close normally open contacts 19a and 20a respectively.

To initiate the burner cycle, a burner selector switch 21, connected with the line $L_1$, is connected in series circuit relation with a damper limit switch 22 which is closed in response to movement of an exhaust fan damper for exhaust fan 16 to the open position (not shown) which functions to control the exit of oven atmosphere from the burner chamber. The normally open contacts 19a and 20a are connected in series with the switches 21 and 22 and a relay 23, connected with the line $L_2$. When energized, the realy 23 is operative to open a pair of normally closed contacts 23a connected between the junction of switches 21 and 22 and an alarm device 24 by a line 24a. When the switch 21 is closed, a current path is provided through switch 21, line 24, and the normally closed contacts 23a to energize the alarm 24. When the relay 23 is energized, the contacts 23a will open to silence the alarm 24.

Connected in parallel circuit relation with the relay 23 is a purge timer, indicated generally at 25, connected between lines $L_2$ and $L_3$, line $L_3$ being connected to the junction of the normally open contacts 20a and the relay 23. The purge timer 25, which is commercially available, includes the normal timer clutch C1 connected across the lines $L_2$ and $L_3$, and a timer motor M connected in series with the normally closed timer contacts 25c which close when the timer motor M times out. The timer 25 also includes normally closed contacts 25a and 25c, and normally open contacts 25b which are opened and closed, respectively, after the timing motor 25 times out. When power to the timer 25 is interrupted, in the normal fashion, the clutch C1 will reset itself in the normal manner. A suitable purge timer may be the Timoflex timer model No. HD Series 30, manufactured by Eagle Manufacturing Company of Davenport, Iowa, U.S.A. The contacts 25a are connected in series circuit with lamp 26 across lines $L_2$ and $L_3$ while the contacts 25b are connected in series circuit with an ignition control relay 27 across the lines $L_2$ and $L_3$. When the relay 23 is energized, the timer 25 is energized along with the indicator light 26 which is provided to indicate the operation thereof. When the timer motor M times out, the normally closed contacts 25c open to stop the motor M, the normally closed contacts 25a open to interrupt the current flow to the indicator lamp 26, and the normally open contacts 25b close to provide a current path through the ignition control relay 27 which, when energized, causes the burner ignitors shown schematically at I, to be energized in a conventional manner. According to existing safety standards, the ignition circuit must be established at all times when the burners are operating. U.S. Pat. 3,352,346 discloses a conventional burner and igniting electrode assembly.

Connected in parallel circuit relation with the relay 27 are a pair of normally open switching contacts 27a connected in series circuit relation with a relay 28. The relay 27 also includes a pair of normally open contacts 27b connected between the junction of the contacts 25b and the relay 27 and one side of a manually operable switch 7a mechanically coupled to the gate 7 so that it opens and closes therewith. The switch 7a is connected at its other side to the junction of contacts 23a and the alarm 24. A vent valve (not shown) which vents any accumulating gas in the oven chamber to atmosphere when the oven is not in operation, is closed by a solenoid 30 connected in parallel circuit relation with the relay 27. The relay 27 also includes a pair of normally open contacts 27c connected in parallel with the damper limit switch 22.

Connected in series between the lines $L_2$ and $L_3$ are a pair of normally open contacts 28a, which close when the relay 28 is energized, and the safety gas valve solenoid 8 forming part of the valve V and serving when energized, to maintain the gate 7 in the open position when it is manually moved thereto. A plurality of conventional safety and pressure switches (not shown) are connected between contacts 20a and line $L_3$ to preclude operation of the system in the event the burners are not otherwise safe to operate.

If the power across the lines $L_1$ and $L_2$ is interrupted for ⅕ to ¼ of a second, the safety solenoid 8 is deenergized, thus releasing the gate 7 and permitting valve V to close. When the power is thus interrupted, some time is required to restart the system in that the oven must be purged prior to reignition. The circuit automatically necessitates repurging because when the power is lost to the timer 25, the timer is automatically reset and must "time out" before the timer contacts 25b will again close to supply current to the remainder of the system. In the time that elapses before the burners are relighted, the product in the ovens can be ruined.

Figure 2:
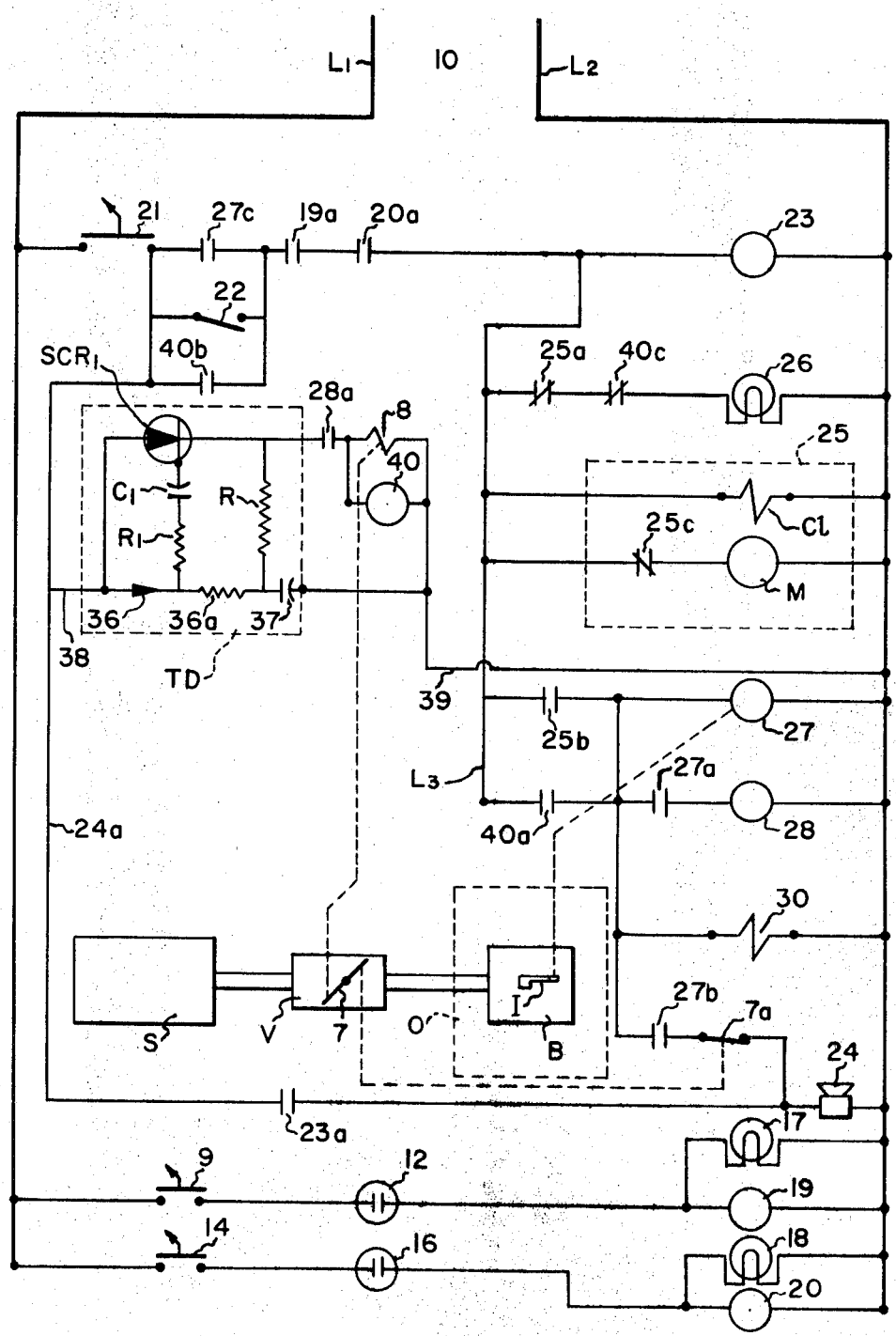
FIG. 2 is a schematic diagram of an electrical burner control circuit incorporating a delay unit and relay according to the invention.

To overcome the problem created, the circuit described thus far includes additional control elements which are illustrated in FIG. 2. The circuit shown therein is substantially identical to the circuit shown in FIG. 1 (and the same identification symbols have been used to identify the same parts) however, the safety solenoid 8 and relay contacts 28a have been disconnected from lines $L_2$ and $L_3$ and connected to a trip delay control unit, designated generally in broken lines as TD. The trip delay unit TD is connected in the circuit in a manner to eliminate the unnecessary shutdowns caused by momentary power interruptions. The trip delay unit TD is schematically shown to include a rectifier 36 for converting the alternating current supplied by lines $L_1$ and $L_2$ to direct current for charging a capacitor 37 which is connected in series with the rectifier 36 and a current limiting resistor 36a across the lines $L_1$ and $L_2$ by the lines 38 and 39 as shown. A series circuit including the gas safety valve solenoid 8, the contacts 28a and a limiting resistor R, which comprises a portion of the TD unit are connected in parallel circuit relation with the capacitor 37 and, if the incoming power to the unit is temporarily interrupted, the capacitor 37 will start discharging its power to the solenoid 8. The anode and cathode of a silicon controlled rectifier $SCR_1$ are connected with the anode of rectifier 36 and the junction of limiting resistor R and the contacts 28a. A biasing resistor $R_1$ and capacitor $C_1$ are connected in series between the cathode of rectifier 36 and the gate electrode of the silicon controlled rectifier $SCR_1$. With a main power supply 10 of 120 volts, 60 cycle A.C., the silicon controlled rectifier $SCR_1$ conducts for approximately ½ second, thus permitting the valve solenoid 8 to receive a direct current power surge sufficient to hold the gate 7 open. In this time, the capacitor $C_1$ charges and cuts off the trigger current to the gate electrode of the silicon controlled rectifier $SCR_1$.

An auxiliary control relay 40 is also connected in parallel circuit relation with the valve solenoid 8 and includes sets of normally open contacts 40a and 40b connected in parallel circuit relation with the switch contacts 25b of the timer 25 and the contacts 27c of relay 27, respectively. A third set of normally closed relay contacts 40c are also connected in series with the contacts 25a and the relay 26 across the lines $L_2$ and $L_3$. When power across lines $L_1$ and $L_2$ is interrupted, the trip delay unit TD will maintain the relay 40 temporarily energized due to capacitor 37 discharging therethrough so that the contacts 40a and 40b remain temporarily closed and thus continuity of the circuit is temporarily maintained. With the safety valve solenoid 8 connected to the trip delay control unit TD, the gate 7 of the safety valve V will remain open and the timer 25 is prevented from resetting for approximately two to three seconds after a power failure. Also, the ignitors are prevented from deenergizing during this interval. If power is restored within this time period, the valve V will remain open, thereby avoiding the inconvenient and time consuming relighting of the burner equipment. If power is not restored within this time period, the gate 7 is released with deenergization of solenoid 8 and automatically returns to the closed position to interrupt the supply of fuel. This two and one half second time delay is long enough to bridge a momentary flicker in the plant power supply, and causes no harm if the power loss is permanent.

The operation of the system disclosed in FIG. 2 will be discussed with the ignitors considered to be initially deenergized and the gas valve V initially in the closed position. Power will be supplied at 10 to the lines $L_1$ and $L_2$. To initiate the igniting cycle, the switch 21 will be closed and the alarm 24 will sound. The damper limit switch 22 is then closed when the exhaust fan damper is opened and switches 9 and 14 are closed to energize the fans 12 and 16, respectively. The contacts 19a and 20a of relays 19 and 20 will also close and relay 23 will be energized to open the normally closed contacts 23a to silence the alarm 24 signaling that the damper has been opened. When contacts 19a and 20a close, the purge timer 25 will also be energized and the light 26 will be illuminated. After a suitable time has elapsed sufficient to enable the blower fan 12 and exhauster fan 16 to purge the system of any collected spurious combustible gases, the purge timer 25 will "time out" and the switch contacts 25b will close to energize the switching relay 27 and energize the solenoid 30 to close the vent valve associated therewith. When the relay 27 is energized, the burner ignitors 1 will be energized and normally open contacts 27a, 27b and 27c will close. When contacts 27b close, current will flow through the normally closed contacts 7a to again energize the alarm indicating that the ignition circuit is established. The switch contacts 7a are then opened to silence the alarm 24 when the gate 7 of the gas supply valve V is opened to supply gas to the burners B. The closing of contacts 27a will permit the relay 28 to be energized, which will close the normally open contacts 28a. This will complete the circuit from line 24a through the silicon controlled rectifier $SCR_1$, to the gas valve solenoid 8 and then to line $L_2$ to momentarily hold the gate 7 of valve V open until capacitor 37 assumes control and capacitor $C_1$ is charged to cut off $SCR_1$. With the gas supply valve V thus open, gas will flow to the burners B and will be ignited. The exhaust damper may be closed or opened to suit baking requirements anytime after the valve 7 is opened, and, if movement of the damper results in the damper limit switch 22 openings, the closed contacts 27c maintain circuit continuity.

If the incoming power from the source 10 is temporarily interrupted, the capacitor 37 of the trip delay control unit TD starts discharging through the control solenoid 8 and the auxiliary control relay 40. After about two to three seconds, the charge on the capacitor 37 is dissipated and the solenoid 8 is deenergized, permitting the gate 7 to close. If the flow of electrical current resumes within the two to three second period, the capacitor 37 simply recharges and the valve V remains open. The discharge of the capacitor 37 through the auxiliary control relay 40 maintains the contacts 40a and 40b closed. The closed contacts 40b maintain current flow to the purge timer 25 and prevent it from being reset. The closed contacts 40a maintain circuit continuity to the relays 27 and 28. It is important that the ignition circuit relay 27 be energized at all times to comply with existing safety standards. It is important that the relay 28 be maintained energized to maintain continuity to the valve solenoid 8.

Figure 3:
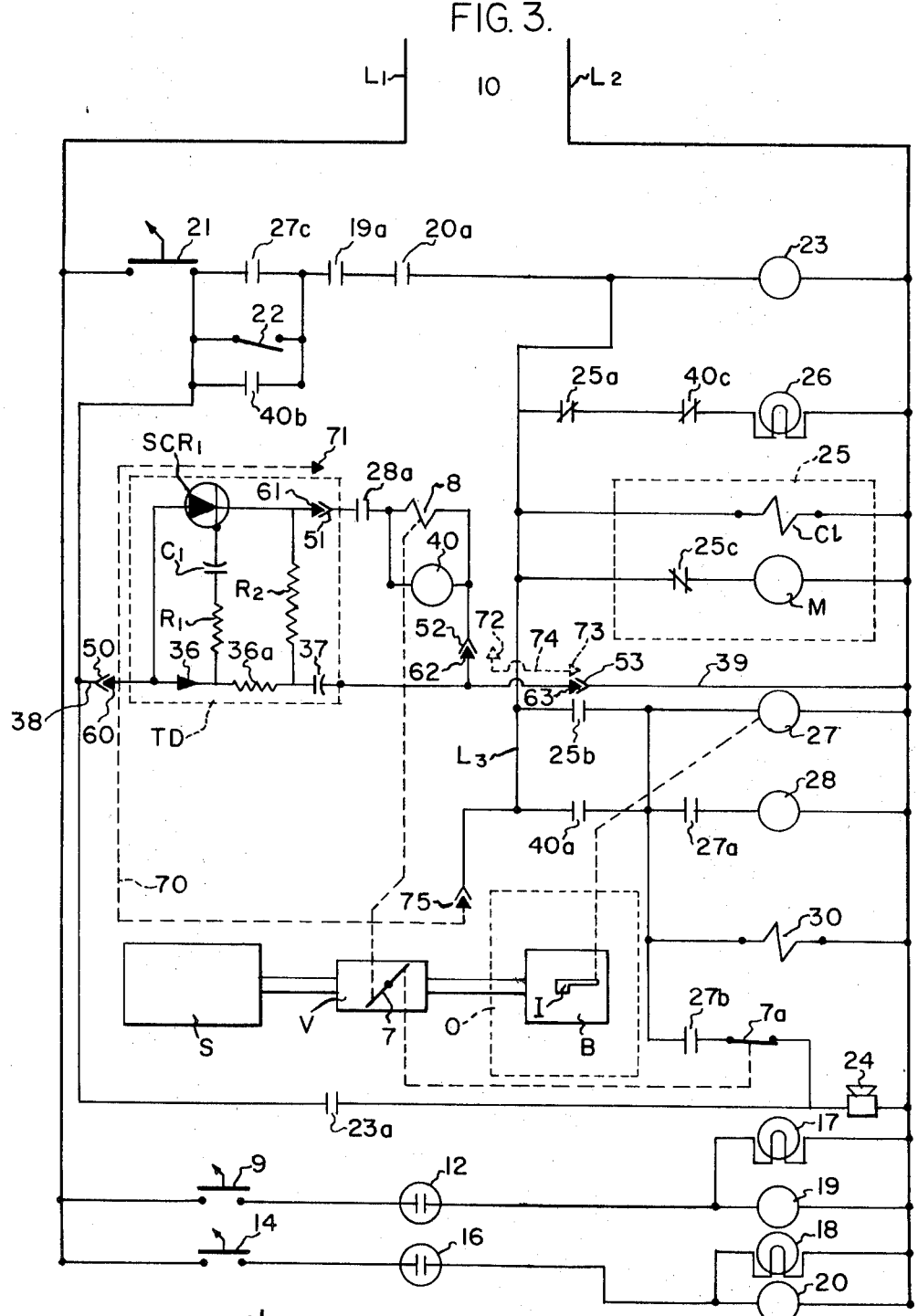
FIG. 3 is a schematic diagram of a burner control circuit illustrating an interchangeable plug-in arrangement for the circuit which will be effective to by-pass the delay unit and convert the circuit from that shown in FIG. 2 to that shown in FIG. 1.
Figure 4:
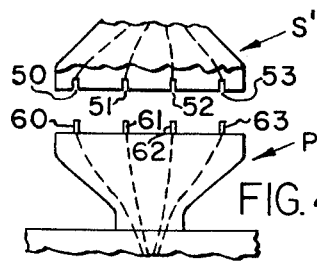
FIG. 4 is a schematic elevational illustration of the socket and interchangeable plug used to by-pass the delay unit.
Figure 5:
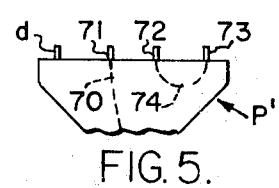
FIG. 5 is a similar view of the other interchangeable connector.

If the trip delay unit TD should malfunction through some internal component failure, a loss of production would result due to the time required to repair the unit. To avoid this possibility, a unique plug-in arrangement has been devised as illustrated in FIG. 3. The elements of FIG. 3 remain identical to that of FIG. 2 with the exception of the addition of one multi-pin socket S (FIG. 4) and two multi-pin plugs P and P' (FIGS. 4 and 5) to the circuit. Associated with the trip delay unit TD is a male connector plug P having four male pins, schmatically shown in solid lines at 60–63 adapted to mate with four complementally formed connectors 50–53, respectively, comprising the female socket receptacle S. The connection between the connectors 50–53 and pins 60–63, connect the trip delay unit TD to the remainder of the circuit. The pin 60 is connected with the anode of the rectifier 36 and the connector 50 is connected with the line 24a. The pin 61 is connected with the junction of limiting resistor R and the silicon controlled rectifier $SCR_1$, and the connector 51 is connected with one side of the normally open contacts 28a. The pin 62 is connected to the capacitor 37. The connector 52 is connected to one side of the solenoid 8 as shown. The connector 63 is connected with the capacitor 37 and the pin 62. The connector 53 is connected with the line $L_2$. A second plug P', which can be alternately used when the trip delay unit TD is removed, is releasably mounted on the panel of the trip delay unit and has a dummy pin d for mating with connector 50, and three male pins 71, 72, and 73 adapted to be alternately connected with the connectors 51, 52 and 53 respectively of the female connector to maintain the circuit when the male plug P and connectors 60–63 are removed from female connectors 50–53. The pin 71 is connected with the line $L_3$ through a line 70 shown in dotted lines and a suitable disconnect 72 whereas the pin 72 is connected with the pin 73 with a line 74 shown in dotted lines. The pin 73 connects with the line $L_2$ through the connector 53 and the line 39.

In the event of a component failure in the trip delay unit TD, the connectors 60–63 are quickly removed from the connectors 50–53 and the dummy plug connectors 71–73, are connected to the female socket. This reestablishes the burner circuitry as shown in FIG. 1 with all of the required safety precautions of the system intact, but without the trip delay feature. When the trip delay unit TD is repaired, it can be rapidly installed by removing the male plug P' and connector pins 71–73 from connectors 51–53 and reconnecting the plug P and pins 60–63 with the connectors 50–53.

The scope of the invention is defined in the appended claims.

What I claim is:

1. An oven burner control system for a fuel fired oven baking system, said oven burner control system including:
    oven fuel burner means adapted to be connected with a source of combustible fuel;
    fuel igniting means adapted to be connected in circuit with an electrical power signal source for igniting fuel to be burned by said burner means;
    means for normally energizing said fuel igniting means to ignite said fuel; and
    power supplying means connected in circuit with said fuel igniting means for maintaining said fuel igniting means energized during a predetermined short duration change in said power signal which otherwise would deenergize said igniting means.

2. An oven burner control system as set forth in claim 1 including timer control means for precluding the energization of the fuel igniting means for a predetermined time after a longer predetermined change in the signal from said power source;
    and means for preventing said timer control means from precluding energization of the fuel igniting means in response to said short duration change in said power signal.

3. An oven burner as set forth in claim 2 wherein said fuel igniting means includes switch means for preventing operation of said timer control means; said relay means includes switch means connected in parallel with said fuel igniting switch means.

4. An oven burner system as set forth in claim 2 including electrically controlled valve means for controlling the flow of combustible fuel between said combustible fuel source and said oven fuel burner means, said valve means being adapted to be energized by an electrical signal from said electrical power source and being responsive to said longer duration change in the signal of said power source to interrupt the flow of fuel from said source to said oven fuel burner means.

5. An oven burner control system as set forth in claim 4 wherein said valve means includes an electrical circuit element; said control means includes capacitor means having a discharge path through said electrical circuit element for supplying said valve means with a signal in response to a short duration change in said electrical signal.

6. An oven burner control system as set forth in claim 5 wherein said control means comprises means for converting alternating current to direct current and charging said capacitor means.

7. An oven control system as set forth in claim 4 wherein said valve means includes gate means manually movable from a normally closed to an opened position and electrical circuit element means operable in response to a change in said power signal for more than said predetermined time for tripping said gate means to said closed position.

8. An oven control system as set forth in claim 4 including means for disconnecting said power supplying means from the remainder of the circuit and means for reconnecting said valve means in circuit with said electrical power source.

9. An oven control system as set forth in claim 8 wherein said means for disconnecting comprises removable connector means having disconnect means for coupling said power supplying means to a plurality of connectors in said circuit and said means for connecting comprises substitute connector means for connecting only selected ones of said connectors in circuit.

10. An oven burner control system for a fuel fired oven baking system including:
   oven fuel burner means adapted to be connected with a source of combustible fuel;
   electrically controlled valve means for controlling the flow of combustible fuel between a combustible fuel source and said oven fuel burner means, said valve means being adapted to be energized by an electrical signal from a source of electrical power and operative to interrupt the flow of fuel from said source to said oven fuel burner means;
   power supplying means connected in circuit with said valve means, and adapted for connection with said source of electrical power, for maintaining said valve means energized to permit fuel to flow to said oven fuel burner means during a short duration change in said power signal which otherwise would deenergize said valve means and interrupt the flow of fuel to said oven fuel burner means; and
   timer control means adapted to be connected in circuit with said power source for precluding the energization of the valve means for a predetermined time after a longer predetermined change in the power signal to interrupt the flow of fuel to said oven fuel burner means;
   said power supplying means including means connected in circuit with said timer control means for preventing said timer control means from precluding energization of said valve means in response to said short duration change in said power signal.

11. An oven control system as set forth in claim 10 including means for disconnecting said power supplying means from the remainder of the circuit and means for reconnecting said valve means in circuit with said electrical power source.

12. An oven control system as set forth in claim 11 wherein said means for disconnecting comprises removable connector means having disconnect means for coupling said control means to a plurality of connectors in said circuit and said means for connecting comprises substitute connector means for connecting only selected ones of said connectors in circuit.

References Cited

UNITED STATES PATENTS

| 3,263,731 | 8/1966 | Hanna et al. | 431—24X |
| 3,288,195 | 11/1966 | Thomson | 431—24 |

EDWARD G. FAVORS, Primary Examiner

U.S. Cl. X.R.

431—254